United States Patent [19]

Palnik

[11] 4,052,317

[45] Oct. 4, 1977

[54] FILTERING EQUIPMENT

[75] Inventor: Karl Palnik, Huntingdon Valley, Pa.

[73] Assignee: The Carolinch Company, Huntingdon Valley, Pa.

[21] Appl. No.: 644,663

[22] Filed: Dec. 29, 1975

[51] Int. Cl.² ............................................. B01D 23/00
[52] U.S. Cl. ............................ 210/323 T; 210/416 R; 210/450; 55/484
[58] Field of Search ................... 210/323 T, 416, 314, 210/450, 477; 55/484

[56] References Cited

U.S. PATENT DOCUMENTS

| 2,440,487 | 4/1948 | Rayburn | 210/323 T |
| 2,904,184 | 9/1959 | Daley | 210/323 T |
| 3,319,793 | 5/1967 | Miller, Jr. et al. | 210/323 T |
| 3,747,765 | 7/1973 | Nowak | 210/323 T |

FOREIGN PATENT DOCUMENTS

| 2,118,405 | 10/1972 | Germany | 210/323 T |

Primary Examiner—Bernard Nozick
Attorney, Agent, or Firm—Synnestvedt & Lechner

[57] ABSTRACT

Filtering equipment has an inlet chamber which houses removable filtering cylindrical cartridges. The circular end surfaces of each cartridge are seated by annular seats, one on a rigid divider which separates the inlet chamber from an oulet, and the other associated with a removable rigid cover which is spaced a predetermined distance from the divider when the cover is fixedly mounted to close the inlet chamber. These two seats serve as seals for the ends of the associated filter cartridge, and at least the latter annular seat is flexibly yieldable in the axial direction of the cartridge. The normal combined axial dimension of the cartridge and its two seats, when not under axial compression, is greater than the normal distance between the divider and the cover, so that, when the cover is clamped down, in its assembled position on the inlet chamber, the flexible annular seat member is distorted, to form a tight seal against the cartridge and the cover. Each cartridge is positioned by a pair of centering posts, one of which is fixed in the cover and passes through the middle of one annular seat, and projects into the central hollow of the cylindrical cartridge; and the other of which is secured in the rigid divider, passes through the associated annular seat, and extends into the central hollow of the cylindrical cartridge.

10 Claims, 4 Drawing Figures

4,052,317

FILTERING EQUIPMENT

BACKGROUND OF THE INVENTION

In the handling of fluids, and particularly of liquids, such as solutions of various types, which may be adapted for or used in a variety of chemical, industrial, medical, or other processes or techniques, where contaminants or impurities may be encountered, or may accumulate, in the liquid or the solution, it has been customary to filter out such contaminants and impurities, by chemical means or mechanical means, or both. Known filtering equipment generally adapted to what may be called mechanical interception of particles, has included a chamber, or a conduit, through which the liquid to be filtered is passed, and it has been known to enclose in such chamber or conduit a filter body or cartridge, of a more or less porous nature, adapted to pick up and retain the undesirable particles, and such cartidges have been so housed in the chamber or conduit that the liquid to be filtered must pass through the cartridge.

When such a cartridge has accumulated the undesirable particles to such a degree that the cartridge is no longer capable of further efficient or adequate filtering action, the cartridge is removed from the equipment, cleand, and replaced; or it can be removed and discarded, and a new cartridge applied. For such filtering equipment, a typical cartridge may comprise an elongated cylinder, formed generally of fibrous material, and of a rather thick body wall, with an axial bore or hollow; and it has been known to pass the liquid to be purified, into such bore ad thence through the wall of the cylinder, to an outlet space; or, more usually, to apply the liquid to the outside cylindrical wall of the cartridge, and have it pass through the wall, and then pass out of one or both ends of the bore.

It is also known to make such cartridges in large part of yarns, threads, or textiles laid up on a perforated or foraminous core or tube, the center of which constitutes the axial bore of the cartridge.

It is found in practice that cartridges supplied from different sources may vary, considerably, in their dimensions, and especially in their length, from a specified figure; either due to the materials from which they are made, the mode of winding or laying them up, shrinkages which sometimes occur, or perhaps other causes; and this has presented problems in mounting, sealing, and replacing cartridges, relative to the fixed environmental structure of the known types of filtering equipment.

Such problems present difficulties, not only with relation to the need for fluid-tightness so as to prevent by-passing of the filter cartridge by all or part of the liquid to be filtered; but also because, in some instances, ill-fitting, or improperly seated and sealed cartridges, make it difficult to properly enclose them in the environmental structure so that there is a risk of losing valuable liquids, and a risk of danger to the environmental structure, either physically, or chemically (when the liquid being filtered is of a corrosive or other dangerous character; and in some cases there has been a danger from poisonous liquids and/or dangerous fumes, where the filtering equipment is subject to leakage.

In the foregoing, and in what follows, the terms fluids, liquids, and solutions, may be used interchangeably, excepting where the prior art imposes limitations with respect thereto or where the context otherwise indicates or requires.

SUMMARY OF THE INVENTION

The primary object of the present invention is to minimize or avoid the aforementioned difficulties and disadvantages, and to do so particularly by the provision of filtering equipment which assures the proper positioning, seating, and sealing, of the filter cartridge, under all conditions of operation, regardless of variations in dimensions of the cartridge from the normal, and to accomplish the foregoing also in multiple-cartridge equipment, even though the different cartridges assembled therein may be, respectively, of differing dimensions.

The invention further contemplates the accomplishment of the foregoing, in filter equipment and in filtering operations, involving a substantial range of conditions of pressure, temperature, composition, corrosiveness, and/or hazardous characteristics of the liquids being filtered, for example: in the filtering-out of undesirable materials from precious metal solutions, such as gold cyanide solutions, and many other solutions, which may be employed in plating operations or in various other processes.

How the foregoing objects and advantages are faccomplished, as well as many others which will hereafter appear or will be evident to those skilled in the art, will be set forth hereinafter, by reference to a typical, and presently preferred, embodiment, as hereinafter described and as illustrated in the accompanying drawings.

Figures 3, 4:
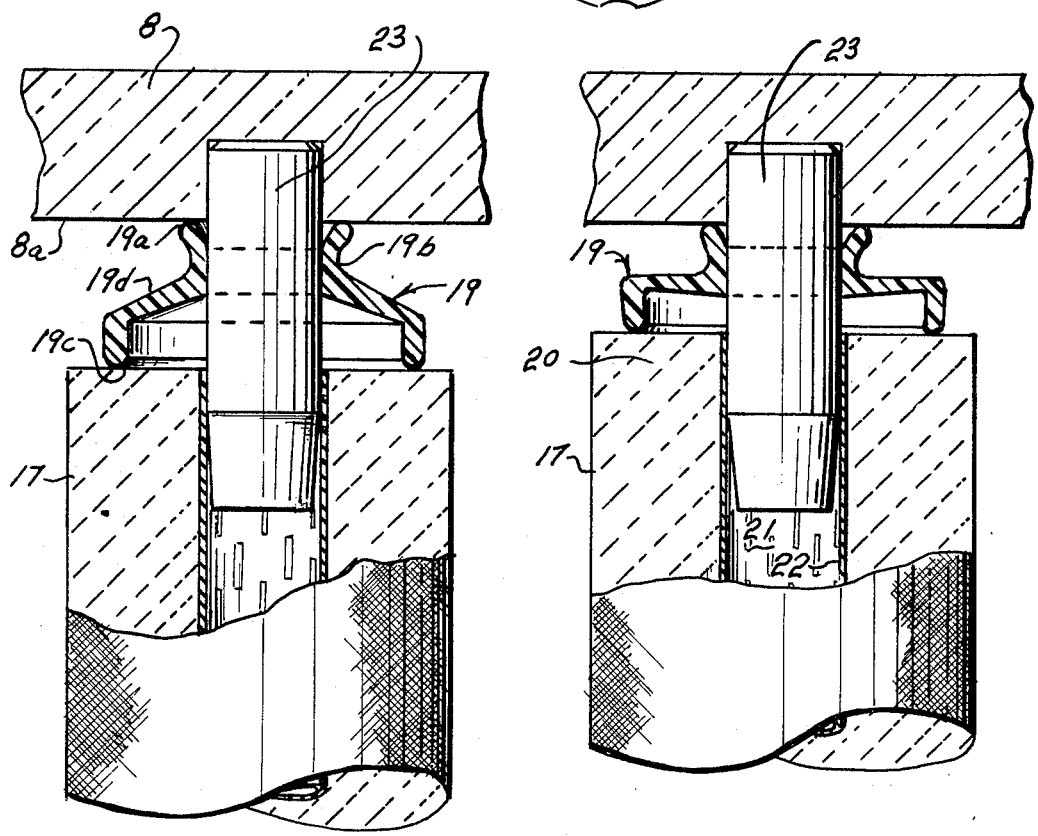
FIG. 3 is an enlarged fragmentary view, showing in sectional detail the preferred construction and arrangement of parts, adjacent one end (in this case, the upper end) of a typical filter cartridge in its relation to a filter chamber cover plate, a centering device fixed in the cover plate and slidably engaging the bore of the cartridge, and a flexibly yieldable cartridge seating device of annular formation, cooperating with the cartridge, the cover and the centering device.
FIG. 4 is a view similar to FIG. 3, showing the same arrangement and assembly of parts, under conditions where the longitudinal dimension of the cartridge is greater than in the case of FIG. 3.

The features shown in FIG. 3 and 4 are typical of certain important features of the present invention, when applied in a filtering equipment employing but a single cartridge; but it will be understood that these two figures, taken together, are also illustrative of the conditions encountered with two different cartridges in one "multiple-cartridge" installation.

DESCRIPTION OF THE PREFERRED EMBODIMENT

Figure 1:
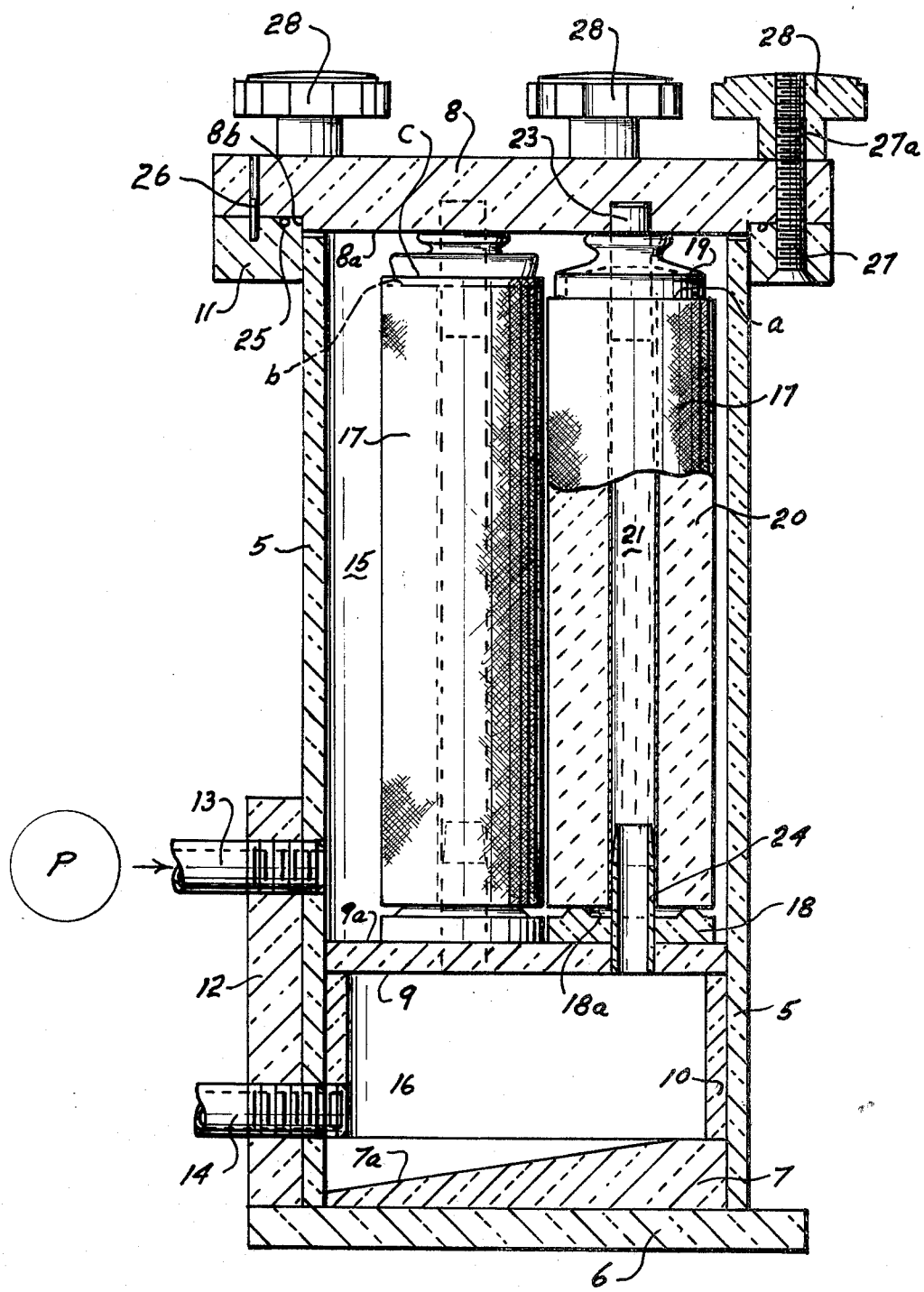
FIG. 1 is a vertical longitudinal sectional view, with parts shown in elevation, taken on the line 1—1 of FIG. 2, through a multiple-cartridge filtering equipment constructed and operating according to the present invention.
Figure 2:
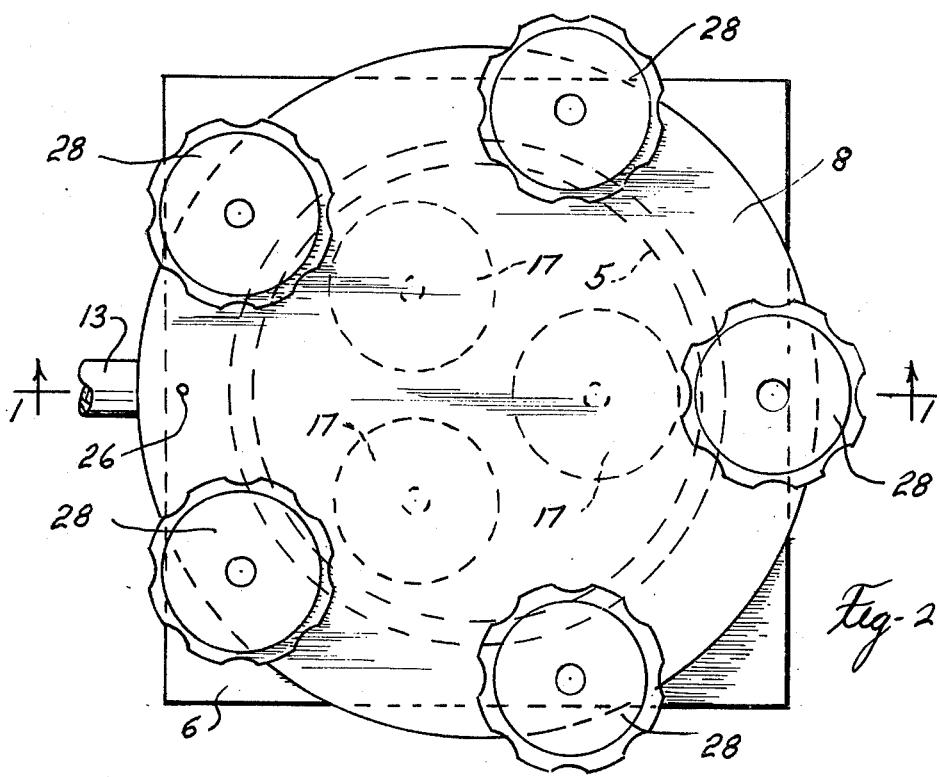
FIG. 2 is a top plan view of the equipment of FIG. 1.

Referring in more detail to FIGS. 1 and 2, it will be seen that the filtering equipment comprises an external casing 5, which in this instance is in a vertical or upright position; a base 6; a supplemental bottom member 7, seated on the base, and fitting within the cylindrical casing 5; a thick, rigid cover or top member 8; a rigid divider plate 9, spaced above the bottom, for example by the distance represented by the internal ring member 10; a reinforcing flange 11 at the top of the main casing 5; and an upright reinforcing member 12 bearing on the base 6, and located at that side of the casing 5 where the inlet and outlet pipes 13 and 14 respectively connect to the chamber 15 and the chamber 16. The chamber 15 may be designated as the upper chamber, the inlet chamber, or the filter chamber — in this illustrated embodiment. The chamber 16 may be conveniently designated a flow passage, a lower chamber, or a discharge manifold.

It will be seen that, when the cover member is fixed in place, as shown in FIG. 1, the predetermined distance between the lower face 8a of the cover 8 and the upper face 9a of the divider 9 must be at least equal to the combined axial dimension of the longest cylindrical filter cartridge 17 which may be employed in the equipment, plus the axial dimension of the bottom seating ring 18, plus the axial dimension of the flexibly yieldable top seating ring 19 when the latter is flexed or distorted to the maximum permissible extent, for example as shown in FIG. 4. This relationship will be discussed further, hereinafter.

Each filter cartridge is desirably of an elongated cylindrical formation with a rather thick body. wall 20, and a central axial bore or hollow 21. The bore may be defined by a perforated tube member 22, on which member may be wound or laid on, or otherwise applied, the filter body 20, which is typically of yarn, threads, textiles, or other fibrous material, rather closely packed so as to collect the undesirable particulate elements to be filtered out of the liquid.

At each end of the cartridge is a centering means or device, which is fixedly cooperative with a rigid structure member, and which has axially slidable relationship with a sealing seat member, (18 or 19 as the case may be) and with the bore of the cartridge. Although a solid centering device 23 is shown at the top of FIG. 1, and a tubular centering device 24 is shown at the bottom, they may both be made tubular, and for convenience and reduction in different parts to be kept in stock the two centering devices or posts for the cartridge, or all such devices for all cartridges (in a multiple installation) may be identical. Whether the centering device at the top be solid or hollow is otherwise substantially immaterial, bu the one at the lower end of each cartridge must be hollow, in order to convey the filtered liquid from the bore 21 down to the flow passage or chamber 16. It may here be noted that, to reduce turbulence, and to facilitate flow, the floor member 7 may have a diagonal slot 7a cut therein, sloping, in a downward direction toward the outlet pipe 14.

At the top of the equipment, the cover member 8 may be shouldered at 8b, so that it seats periherally and also downwardly against the flange 11 of the main casing. An O-ring 25 is positioned to form a seal between the members 8 and 11. A stainless steel dowel pin 26 is preferably inserted in these two members, to fix them as against relative rotation. For a strong connection between the body 5 and the cover 8, as against internal pressure in the chamber 15, and, in general, to hold the assembly together, stainless steel pins 27 may be installed in an upward direction, from the bottom of ring 11, through the cover 8, and having a projecting threaded portion 27a, onto which may be screwed a knurled knob 28, which for example may be black phenolic composition casting. In the installation shown in FIGS. 1 and 2, there are five such knobs 28, each of course adapted to be screwed onto a corresponding stainless steel pin 27.

Further, as seen in FIG. 2, there are three cartridges 17.

A circulating pump is shown diagrammatically at P, and the liquid to be filtered flows therefrom into inlet pipe 13, as shown by the arrow in FIG. 1. The discharge from outlet chamber 16 is through the pipe 14, also as shown by an arrow in FIG. 1.

In the preferred embodiment, the bottom annular seat 18 is not only rigid, but also has a ring-like protuberance 18a on its upper surface, so as to form a tight seal with the body 20 of the cartridge 17. At the top, the yieldingly flexible annular seat member 19, under the conditions shown in FIG. 3 (with cartridge 17 of minimum length), has its inner (upper) peripheral surface 19a bearing against the face 8a of the cover, its reduced neck portion 19b fitting close around the centering post 23, and its lowermost peripheral surface 19c (of larger diameter than the portion 19a) bearing down on the upper end of the body 20 of the cartridge 17. In this condition, there is a downwardly and outwardly flaring portion 19d extending between the portions 19b and 19c. The positive pressure in chamber 15, imposed by pump P, aids in maintaining a tight seal of the member 19, relative to the cartridge 17 (on the one hand) and to the cover 8 and centering device 23 (on the other hand).

From the foregoing, it will be seen that, regardless of length differences, from cartridge to cartridge (in a single-cartridge installation); or of length differences of two or more cartridges (in a multiple-cartridge installation); provided that the differences are within the scope of the overall possibilities for distortion of the sealing seat member 19; the cartridges and their cooperating associated parts, are, by the present invention, assured of proper sealing — with all of the attendant advantages, and the overcoming of prior art disadvantages, heretofore referred to; and this is accomplished, in a very simple and inexpensive way, and with mechanical certainty; preferably supplemented by the differential pressure conditions set up by the pump which is normally employed in filtering equipment. At the same time, the centering devices serve their proper functions (including the flow function served by the devices 24) despite the vagaries in cartridge lengths which are so often encountered in practice.

About the only exceptions to the foregoing are the following: First, if a cartridge is so short that the sealing at the top is not effected, when the cover 8 is fastened down, then a substantial leakage will occur, and this will normally be so obvious that it will be quickly detected; and the offending cartridge can be removed. Second, if a cartridge is so long, that the sum of the vertical dimension of seat member 18, cartridge 17, and sealing seat 19 (in its completely collapsed or distorted condition) amounts to a dimension greater than the vertical distance from the surface 9a of divider 9 to the surface 8a of cover 8, then the cover cannot be brought down tight on the flange 11 of the main casing. At the very least, this would result in leakage to the outside of the equipment, which again would be obvious, and the offending cartridge would be replaced.

As to the preferred materials, those which enter into the cartridges themselves (which are more or less standardized in the filtering art) have been briefly mentioned already; but it might be added that the perforated core members 22, instead of stainless steel, may be made of polypropylene, or other sufficiently rigid material and sufficiently free from attack by the solutions which are being filtered. The fibrous or porous filtering body 20 of the cartridge may be made of cotton, or polypropylene, or of a material designated "DELRIN", or other available materials which will intercept the particles or other substances which are to be filtered out of the solution, provided the filter material be of a character not detrimentally affected by the solution. The novel seating and sealing members may also be made of various materials, such as neoprene, Buna-N, D-195 "VITON" composition, No. 60 durometer, or equivalent materials which will be sufficiently resistant to the action of the solution being filtered. Although the centering devices 23 and 24 may be of stainless steel, they may also be of Schedule 40 PVC. The O-ring 25 may be of material like the sealing devices 19. The general structure of the assembly, i.e., such parts as the cylindrical casing 5, base 6, floor member 7, cover 8, divider 9, and strengthening parts 10, 11 and 12 may generally be made of strong, rigid, PVC, all such parts being chemically welded together, excepting, of course, the cover 8 which must be removable.

Although the seating and sealing features of the present invention may be utilized in filtering equipment quite different from the environmental disclosure herein shown and described, there are special advantages in employing the same in connection with vertically-elongated apparatus, where the weight of the cartridge aids in sealing it on a relatively hard seat at the bottom, while at the same time the yielding, annular, resilient seating and sealing device at the top is relieved of the weight of the cartridge.

It will be seen that FIGS. 3 and 4 typically illustrate the adaptability of the equipment to a relatively short cartridge and a relatively long one. FIG. 1 shows how, in a multiple-cartridge assembly, each cartridge may differ in length from each of the others (as indicated at a, b, and c) and yet all of them will be properly seated and sealed, without any need to alter the normal seating and sealing and securement of the cover plate member 8 which is common to them all. In practice, it is not uncommon to encounter a half-inch variation in a supposedly standard-length cartridge of 10 inches; and comparable proportional variations in 20 inch and 30 inch cartridges.

I claim:

1. Filtering equipment for filtering fluid under pressure, adaptable for insertion and removal of at least one filter cartridge of the type which may vary in dimension, particularly length and end configuration, comprising a filter chamber, a flow passage, a rigid divider between said chamber and said passage including at least one discharge connection between said chamber and said passage, a removable rigid cover for said chamber spaced from said divider a predetermined distance with the cover fixedly mounted to close said chamber, at least one substantially cylindrical filter cartridge in the chamber having a central hollow and adapted to be removably positioned within said chamber, said hollow connected with said discharge connection to allow flow of said fluid from said chamber, through said cartridge, through said discharge connection to said flow passage, a first annular seat member and a second annular seat member associated respectively with the end portions of said cartridge and each substantially centered with respect to said central hollow of the cartridge, one seat member being secured between the cartridge and the divider and the other seat member being secured between the cartridge and the cover, the said filter cartridge and the said two seat members having a total axial dimension greater than the said predetermined distance between the rigid divider and the rigid cover when the cartridge and said two annular seat members are uncompressed, and said first annular seat member comprising a resilient material substantially nonpermeable and impervious to attach by the fluid to be filtered and having an interior hollow cavity defined by a flexible wall, said flexible wall being deformable in the direction of the axis of the cartridge to such extent as to accommodate said filter cartridge and to permit the two seat members to seat and to seal the ends of the filter cartridge when the cartridge and said annular members are pressed between the cover and the rigid divider.

2. Equipment according to claim 1 wherein said chamber is an inlet chamber, and a positive-pressure pump is coupled to the said chamber.

3. Equipment according to claim 1 wherein said interior hollow cavity extends from the axis of the annular seat member to provide a flexible peripheral wall which bears upon and seals the filter cartridge.

4. Equipment according to claim 1 wherein said first annular seat member is positioned between and abuts the cartridge and the cover and includes a hole adapted to aline with the hollow of the cartridge, and further including a cartridge centering device depending from the cover, extending through the hole and interfitting with the resilient annular seat member, and protruding into the hollow of the cartridge to provide for rigidity of the cartridge in the filter chamber.

5. Equipment according to claim 4, wherein the centering means is fixed to one of the specified rigid elements of the equipment and has a relatively sliding engagement axially with a cartridge member and a seat member.

6. Equipment according to claim 4 wherein said second annular seat member is positioned between and abuts the cartridge and the rigid divider and is a rigid, hard, resilient, polymeric sealing ring.

7. Equipment according to claim 6 wherein said second annular seat member includes a hole adapted to align with the hollow of the cartridge and the said discharge connection, and further including a hollow tubular centering device extending through the hole and interfitting with the second seat member, protruding into the hollow of the cartridge and into the discharge connection to provide for rigidity of the cartridge in the filter chamber and to allow flow of fluid from the chamber through the cartridge to flow passage.

8. Equipment according to claim 7 wherein said first annular seat member includes an inner upper peripheral surface, a reduced neck portion fitting close around the centering device, a lowermost peripheral surface, said inner upper peripheral surface bearing against the cover and said lowermost peripheral surface bearing downwardly on the cartridge to provide and maintain a tight seal therewith.

9. Equipment according to claim 8 wherein said interior hollow cavity extends radially from the axis of the annular seat member to provide a relatively thin, flexible lowermost peripheral wall which bears upon and seals the filter cartridge when pressure is imposed upon the lowermost peripheral wall.

10. Equipment according to claim 9 wherein said second annular seat member includes a ring-like protuberance on its surface abutting the cartridge to provide a tight seal therewith.

* * * * *